Sept. 21, 1954  R. ANNEN  2,689,771
LUBRICATING DEVICE FOR BEARINGS
Filed April 10, 1950

Inventor
Robert Annen
by Karl Michaelis, Atty.

Patented Sept. 21, 1954

2,689,771

UNITED STATES PATENT OFFICE 2,689,771

LUBRICATING DEVICE FOR BEARINGS

Robert Annen, Bienne, Switzerland, assignor to Roulements à Billes Miniatures, S. A., Bienne, Switzerland Application April 10, 1950, Serial No. 154,969

Claims priority, application Switzerland September 2, 1949

8 Claims. (Cl. 308—187.2)

The present invention relates to bearings, and more particularly to bearings provided with automatic lubricating devices for shafts traversing the bearing. This invention forms a further development of the bearings disclosed in my copending application for patent of the United States Serial No. 154,970, filed of even date herewith, now Patent 2,655,416 issued October 13, 1953, which relates to end bearings for vertical shafts.

The lubrication of bearings of vertical shafts rotating at high speed, where friction is to be reduced to a minimum, poses serious problems. The prior art has attempted to cope with these problems by the introduction, into the bearings, of a very small quantity of oil which had to be renewed frequently. This procedure has been followed, for example, in lubricating the ball bearings of gyroscopes. Frequent renewal of the lubricant, however, has the serious disadvantage of requiring cleaning and, consequently, taking the device apart every time the lubricant had to be exchanged, thus involving, manifestly, an excessively costly procedure.

According to the present invention both ends of an outer bearing member, which may be a sleeve forming the outer race for antifriction elements (balls or rollers), are sealed by sealing means forming oil-filled capillary gaps around the shaft extending through the bearing, at least one of these sealing means being a pair of centrally perforated caps nested in spaced relation and enclosing between them a capillary oil space into which oil is fed by a rotating part such as the shaft or the antifriction elements, if any, or both.

The drawings affixed to this specification and forming part thereof illustrate diagrammatically and by way of example, several embodiments of the bearing according to the invention.

Figure 1:
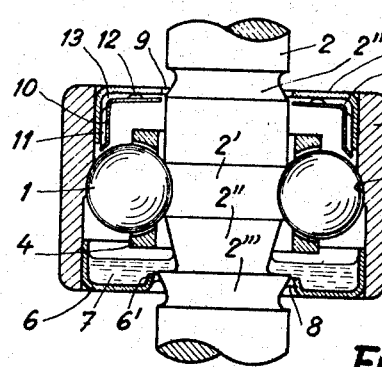
Fig. 1 is a longitudinal section of a first embodiment.
Figure 2:
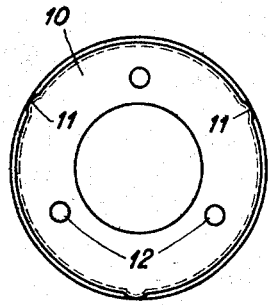
Fig. 2 is a plan view of an interior cap.

Referring now to the drawings wherein like elements are denoted by identical reference numerals, and first to Fig. 1, this embodiment of the invention involves a bearing having balls 1 running on an inner raceway 2' formed on a vertical shaft 2 and on an outer raceway 3' formed on an outer race-ring 3, the cage holding the balls being shown at 4. The bearing comprises the outer race-ring 3 and two caps 5 and 6 fitted with their cylindrical flanges, into the race-ring 3. The bearing is shown in the position in which it is intended to work, and wherein the lower cap 6 constitutes an oil reservoir 7 from which the oil is conveyed to the surfaces to be lubricated, by a shaft portion 2'' having an upwardly increasing diameter. The cap 6 has a central opening traversed by the shaft and the edge 6' of this opening is raised (beaded) so as to extend into the interior of the bearing. The shaft portion 2''', traversing the opening in cap 6, has the shape of a truncated cone whose base is situated in a plane slightly above the upper edge of the flange portion 6', so as to form a capillary gap 8 preventing the oil from escaping from the reservoir 7.

The upper cap 5 also has a central opening whose diameter slightly exceeds that of a shaft portion 2'''' having an upwardly increasing diameter and traversing this opening in a manner such as to create a capillary gap shown at 9.

An inner cap 10 having a central aperture, bosses 11 arranged on the periphery and bosses 12 provided in the flat portion, is pressed into the cap 5 and forms jointly with the latter, a capillary space 13 extending substantially from the outer raceway 3''' to the capillary gap 9. The major portion of the oil conveyed by the shaft portion 2'' to the inner raceway 2', and passed on from the latter to the outer raceway 3' by the balls 1, returns to the reservoir 7. However, if the space 13 is not yet filled, owing to capillary action, the oil extends in this space until it reaches the capillary gap 9. When the oil fills the gap 9 the bearing is closed hermetically, and remains closed even if operation is suspended for a long time, owing to the oil reserve contained in the capillary space 13.

Figure 3:
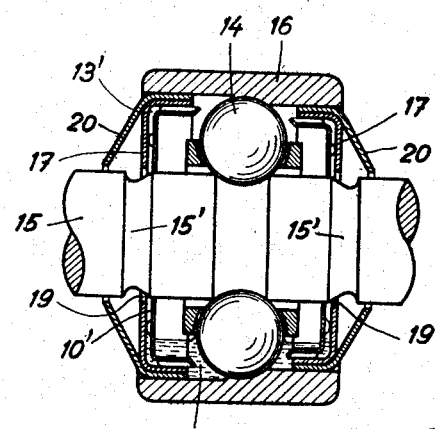
Figs. 3 and 4 are section views similar to Fig. 1, showing a second and third embodiment, respectively, both constituting lubricating devices for bearings of horizontal shafts.

The second embodiment shown in Fig. 3 involves a bearing having balls 14 surrounding a horizontal shaft 15. The envelope is formed by the outer race-ring 16 and by two caps 17 which are similar to cover 5 of Fig. 1. Each of these caps is fitted with an inner cap 10'. The wall of the central opening of each cap 17 surrounds a shaft portion 15 which is similar to the shaft portion 2'''' of Fig. 1. The oil indicated at 18 and contained in the lower portion of the bearing, is splashed on the surfaces to be lubricated and is conveyed to the capillary gaps 19, by the capillary spaces 13′ located between the caps 10′ and 17.

The auxiliary caps 20 comprise a cylindrical portion pressed into the outer race-ring 16, and a truncated cone-shaped portion having a center aperture traversed by the shaft 15. These auxiliary caps 20 protect the capillary gaps 19 against the entry of dust, a danger frequently met with in machines for the textile industry, for example.

Figure 4:
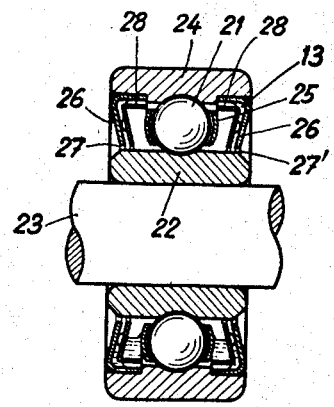

In the embodiment of Fig. 4, the bearing comprises balls 21 and an inner race-ring 22 rotating with the shaft 23, and an outer race-ring 24 and a cage 25 for the balls 21. Two caps 26 forming part of the envelope surrounding the bearings, comprise cylindrical portions pressed into the outer race-ring 24, and an almost flat, conical portion provided with a central opening whose wall is separated from the inner race-ring 22 by a capillary gap 27. The interior, caps 28 are similar to the interior cap 10 of Fig. 1, and together with the caps 26, define capillary spaces through which the oil is conveyed to the capillary gaps 27 and 27′.

Figure 5:
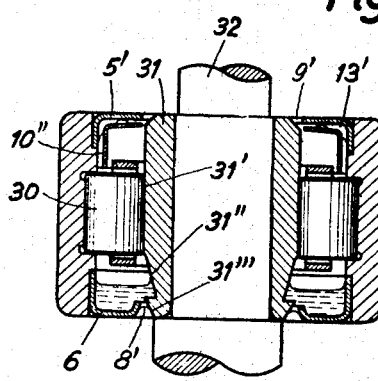
Figs. 5 and 6 are views similar to that of Fig. 1, showing a fourth and fifth embodiment, respectively, constituting lubricating devices for roller bearings and sliding bearings, respectively, of vertical shafts.

The fourth embodiment, shown in Fig. 5, closely resembles the embodiment of Fig. 1; however, the balls are replaced by rollers 30 and the inner raceway 31′ is worked into an inner race-ring 31 rotating together with shaft 32. The shaft portions 2″ and 2‴ are replaced by corresponding ring portions 31″ and 31‴. The lower cap 6′, the upper cap 5′ and the inner cap 10″ fitted into the latter, are substantially reproductions of caps 6, 5 and 10, respectively, of Fig. 1 unchanged. Consequently, there are formed corresponding capillary gaps 8′ and 9′ and corresponding capillary spaces 13′ through which oil coming from the surfaces to be lubricated is conveyed to the upper capillary gap 9′.

Figure 6:
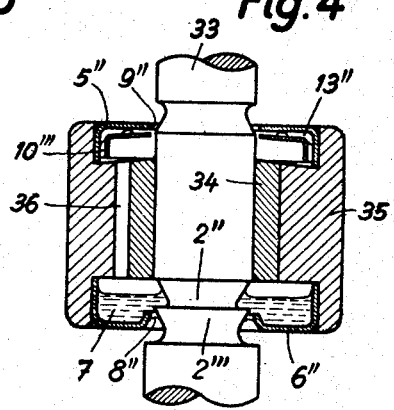

Fig. 6 shows a fifth embodiment which is a modification of the lubricating device as adapted to a sliding bearing for a shaft 33. The bushing 34, made of an appropriate material, is pressed into an outer ring 35 sealed by caps 5″ and 6″. There are also the shaft portions 2″ and 2‴, the capillary gaps 8″ and 9″ and the inner cap 10‴ corresponding to their counterparts shown in Fig. 1. The oil conveyed by the shaft portion 2″, from the reservoir 7′ to the surfaces to be lubricated, returns to the reservoir 7′ through a groove 36 worked into the wall of the bore of the outer ring 35 and extends in the capillary space 13″ until it reaches and fills the upper capillary gap 9″.

It is to be understood that it is not intended to limit the scope of the patent to the exact details of construction, design and operation shown and described as various modifications falling within the scope of the appended claims will readily suggest themselves to persons skilled in the art. Thus, for example, one or more auxiliary caps 20 could be provided in the embodiments other than that of Fig. 3 where such caps have been illustrated. In all embodiments of the invention, two shaft portions 2″ or inner ring portions 31″ could be provided, located on either side of the inner raceway, in the case of anti-friction bearings, or of the sliding surface in case of sliding bearings. Moreover, one single shaft portion 2″ or race-ring portion 31″ could be provided in the embodiments which, as illustrated, lack such portions. Still another possibility is to fit each of the two caps of any of the embodiments with an inner cap of the type of cap 10 in Fig. 1.

Further effects may be obtained by modifying the shape of the spaces 13 in any one of the embodiments illustrated or modifications thereof. If, for example, the width of such a space 13 decreases towards the center of the bearing, i. e. towards the capillary gap, there will be a capillary effect tending to bring lubricating oil to the inner race-ring or to the shaft, to provide for or conserve, the oil film in the capillary gap. If, on the contrary, said space 13 has a width increasing slightly towards the shaft or the inner race-ring, the oil will rather be drawn away from said capillary gap into the inner space of the device. In the first case, the capillary effect may be reinforced, in the second case, diminished, by the centrifugal force on the condition that the rotating part of the device is constituted by the exterior race-ring and the parts fixed thereto.

Such modifications as exemplified above, are clearly within the realm of the invention and do not form any departure therefrom nor do they entail any sacrifice in the advantages obtained.

I claim:

1. A bearing for a rotary shaft comprising a stationary member, a rotating shaft member passing therethrough, anti-friction means interposed between the shaft and stationary members, outer cap members between the stationary member and the shaft member forming capillary gaps with the shaft member, and an inner cap member fixedly nested in an outer cap member and spaced therefrom to form a capillary space extending from the anti-friction means to a capillary gap to convey lubricating oil from the anti-friction means to the capillary gap and hermetically seal the bearing.

2. A bearing for a rotary shaft comprising a stationary member, a rotating shaft member passing therethrough, anti-friction means interposed between the shaft and stationary members, annular shaped outer cap members secured to the stationary member and encircling said shaft member, means on the shaft member forming capillary gaps with the outer cap members, and an annular shaped inner cap member fixedly nested in an outer cap member and spaced therefrom to form a capillary space extending from the anti-friction means to a capillary gap to convey lubricating oil from the anti-friction means to the capillary gap and hermetically seal the bearing.

3. A bearing as set forth in claim 2 in which the capillary forming means on the shaft member comprise outwardly diminishing diameters on the shaft member adjacent the outer cap member.

4. A bearing for a rotary shaft comprising a stationary member, a rotating shaft member passing therethrough, anti-friction means interposed between the shaft member and the central portion of the stationary member, annular shaped outer cap members secured to the stationary members and encircling the shaft member, means on the shaft member forming capillary gaps with the outer cap members said means comprising outwardly diminishing diameters on the shaft member adjacent the cap members, and an annular inner cap member fixedly nested in an outer cap member and spaced therefrom to form a capillary gap extending from the central anti-friction portion of the stationary member to a capillary gap to convey lubricating oil from the anti-friction means to the capillary gap and hermetically seal the bearing.

5. A bearing for a rotary shaft comprising a stationary member, a rotating shaft member passing therethrough, anti-friction means interposed between the stationary and shaft members, outer cap members between the shaft and stationary members forming capillary gaps with the shaft member one of said cap members forming a reservoir for lubricating oil, means on the shaft member for conveying oil from the reservoir to the anti-friction means, and an inner cap member fixedly nested in an outer cap member and spaced therefrom to form a capillary space extending from the anti-friction means to a capillary gap to convey oil from the anti-friction means to the capillary gap and hermetically seal the bearing.

6. A bearing for a rotary shaft comprising a stationary member, a rotating shaft member passing therethrough, anti-friction means interposed between the stationary and shaft members, an annular shaped outer cap member secured to the stationary member and encircling the shaft member, a second outer cap member forming a reservoir for lubricating oil, an outwardly diminishing diameter on the shaft member immediately adjacent an encircling outer cap member to form a capillary gap therewith, means on the shaft member for conveying oil from the reservoir to the anti-friction means, said means comprising an increasing shaft member diameter between the reservoir and the anti-friction means, and an annular inner cap member fixedly nested in the first-mentioned outer cap member and spaced therefrom to form a capillary space extending from the anti-friction means to the capillary gap between the first-mentioned outer cap member and the shaft member to convey lubricating oil from the anti-friction means to the capillary gap to hermetically seal the bearing.

7. A bearing as set forth in claim 6 in which the outer cap member forming a reservoir for lubricating oil forms a capillary gap with an adjacent outwardly decreasing diameter on the shaft member.

8. A bearing for a rotary shaft comprising a stationary member, a rotating shaft member passing therethrough, anti-friction means interposed between the stationary and shaft members, an annular cup-shaped outer cap member located at each end of the stationary member and encircling the rotating shaft member, outwardly diminishing diameters on the shaft member immediately adjacent said cap members and forming capillary gaps therewith, and an annular cup-shaped inner cap member fixedly nested in each outer cap member and spaced therefrom to form therewith an annular, cup-shaped capillary space extending from the anti-friction means to the capillary gap for conveying lubricating oil from the anti-friction means to the capillary gaps to hermetically seal the bearing.

References Cited in the file of this patent

UNITED STATES PATENTS

| Number | Name | Date |
| --- | --- | --- |
| 1,372,801 | David | Mar. 29, 1921 |
| 1,827,409 | Waring | Oct. 13, 1931 |
| 1,828,546 | Sandstrom | Oct. 20, 1931 |
| 1,902,620 | Cobb | Mar. 21, 1933 |
| 2,054,580 | Delaval-Crow | Sept. 15, 1936 |
| 2,219,388 | Hansen | Oct. 29, 1940 |
| 2,385,306 | Shafer | Sept. 18, 1945 |